United States Patent
Panchamgam et al.

(10) Patent No.: US 10,467,654 B2
(45) Date of Patent: Nov. 5, 2019

(54) FORECASTING CUSTOMER CHANNEL CHOICE USING CROSS-CHANNEL LOYALTY

(71) Applicant: ORACLE INTERNATIONAL CORPORATION, Redwood Shores, CA (US)

(72) Inventors: Kiran V. Panchamgam, Bedford, MA (US); Su-Ming Wu, Waltham, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1097 days.

(21) Appl. No.: 14/845,792

(22) Filed: Sep. 4, 2015

(65) Prior Publication Data
US 2017/0068962 A1    Mar. 9, 2017

(51) Int. Cl.
*G06Q 30/00*    (2012.01)
*G06Q 30/02*    (2012.01)

(52) U.S. Cl.
CPC ......... *G06Q 30/0251* (2013.01); *G06Q 30/01* (2013.01); *G06Q 30/02* (2013.01); *G06Q 30/0204* (2013.01)

(58) Field of Classification Search
CPC .............. G06Q 30/02; G06Q 30/0201; G06Q 30/0202; G06Q 30/01; G06Q 30/0251; G06Q 30/0204
See application file for complete search history.

(56) References Cited

U.S. PATENT DOCUMENTS

| 2009/0043593 A1* | 2/2009 | Herbrich | G06Q 10/04 705/318 |
| 2014/0172507 A1* | 6/2014 | Menon | G06Q 30/0204 705/7.33 |

(Continued)

OTHER PUBLICATIONS

Neslin et al., Key Issues in Multichannel Customer Management: Current Knowledge and Future Directions; Journal of Interactive Marketing 23 (2009) pp. 70-81; downloaded from: https://www.academia.edu/7969771/Key_issues_in_Multichannel_Customer_Management_Current_Knowledge_and_Future_Directions.

(Continued)

*Primary Examiner* — William S Brockington, III
(74) *Attorney, Agent, or Firm* — Kraguljac Law Group, LLC (57) ABSTRACT

Systems, methods, and other embodiments associated with forecasting customer channel choice using cross-channel loyalty are described. In one embodiment, a method includes accessing historical values for each of one or more loyalty variables for respective customers. The method also includes determining respective loyalty variable predictors for each of the one or more loyalty variables for each customer based on the historical values. In response to a trigger event associated with a given customer, the loyalty variable predictors for the customer are used to estimate a present value of each of the one or more loyalty variables for the customer. The present value of each of the loyalty variables is input to a forecast model that calculates, for each channel, a probability that the customer will make a purchase using the channel. The purchase probabilities are provided for use in selecting a marketing message for the customer.

11 Claims, 6 Drawing Sheets

(56) References Cited

U.S. PATENT DOCUMENTS

2015/0026010 A1* 1/2015 Ellison .............. G06Q 30/0613
705/26.41
2015/0100384 A1* 4/2015 Ettl .................... G06Q 30/0206
705/7.35

OTHER PUBLICATIONS

Biyalogorsky et al., Clicks and Mortar: The Effect of On-line Activities on Off-line Sales; Marketing Letters 14:1, 21-32, 2003; 2003 Kluwer Academic Publishers, Manufactured in The Netherlands; downloaded from: http://citeseerx.ist.psu.edu/viewdoc/download;jsessionid=0955BAAD6D8CDC28663426A08313A9CA?doi=10.1.1.197.5329&rep=rep1&type=pdf.

Blattberg et al., Database Marketing, Analyzing and Managing Customers, Chapter 25, Multichannel Customer Management; pp. 635-674.

Kevin Hillstrom; No Turning Back for Multichannel Database Marketing; Direct Marketing News; pp. 1-3; downloaded on Jul. 17, 2015 from: http://www.dmnews.com/dataanalytics/no-turning-back-for-multichannel-database-marketing/article/94023/.

Pauwels et al; Building with Bricks and Mortar: The Revenue Impact of Opening Physical Stores in a Multichannel Environment; pp. 1-46; downloaded on Nov. 9, 2015 from: http://mba.tuck.dartmouth.edu/pages/faculty/scott.neslin/docs/building_bricks_mortar_120811.pdf.

Ansari et al; Customer Channel Migration; pp. 1-38; downloaded on Nov. 17, 2015 from: http://pdfsr.com/pdf/customer-channel-migration.

Valentini et al; Decision Process Evolution in Customer Channel Choice; Journal of Marketing 75:6; Nov. 2011; pp. 72-86; downloaded from: http://www.isihome.ir/freearticle/ISIHome.ir-22036.pdf.

* cited by examiner

FIG. 6

FORECASTING CUSTOMER CHANNEL CHOICE USING CROSS-CHANNEL LOYALTY

BACKGROUND

Many retailers now sell both in-store and on-line. The environment in which a retail transaction occurs is referred to as the transaction's channel. Often, customers "channel switch," meaning a customer researches a product in a first channel (e.g., on-line) and then purchases the product in a second channel (e.g., in-store). Retailers are often interested in forecasting which channel a particular customer researching a particular product on-line will use to complete the purchase. In other words, retailers want to know the likelihood the customer will channel switch.

A multi-channel retailer can improve sales by forecasting whether a given customer will purchase in-store or on-line. The forecast information can be used to enable the retailer to create promotions specifically targeted to the customer's likely choice of channel. For example, if the customer usually researches products on the retailer's website but then purchases the products in the retailer's stores, then depending on the retailer's goals, the retailer could offer the customer a coupon for an on-line purchase. Such customer targeted promotions are of major interest to retailers due to the move within the retail industry towards customer-specific selling and marketing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems for forecasting which channel a customer will choose when shopping at a particular retailer have typically relied on choice models, which are standard statistical models that forecast a customer' choice among a given fixed set of possible choices. As with all statistical models, choice models make their forecasts from measurements of various quantities, which are the variables of the model. Standard variables for forecasting channel choice are various demographic quantities concerning the customer, such as income or location, plus attributes about each channel and about the product in which the customer is interested. None of the variables account for channel switching, which is the propensity of many customers to look at merchandise on a retailer's website but then make the actual purchase in one of the retailer's stores.

Systems and methods are described herein that provide a forecast of which channel a customer will use to purchase a product based the particular customer's historical channel choices, which can be thought of as the customer's "cross-channel loyalty." The systems and methods described herein also include a mechanism to learn changes in a customer's channel choices over time.

Figure 1:
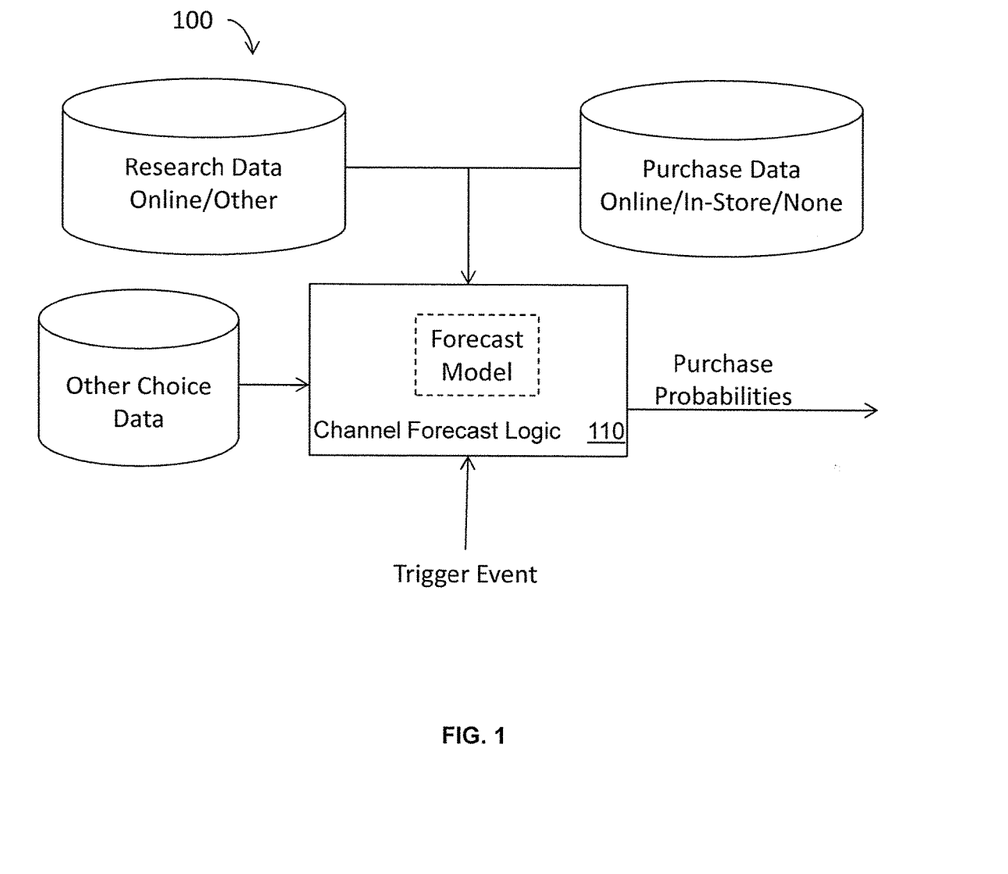
FIG. 1 illustrates one example embodiment of a system associated with forecasting customer channel choice using cross-channel loyalty.

With reference to FIG. 1, one embodiment of a system 100 associated with forecasting customer channel choice using cross-channel loyalty is illustrated. The system 100 accesses customer and product related data to calculate purchase probabilities in response to a trigger event. In one embodiment, the trigger event is a customer "clicking" on a given product on a retailer's website and the purchase probabilities output by the system correspond to the probabilities that the customer will either i) buy the product on-line, ii) buy the product in-store, and iii) not buy the product at all.

Two types of customer-specific data are input to the system 100: purchase data and research data. Purchase data records each product purchased from the retailer by a customer, where the purchase was made (e.g., on-line or a specific store location), and the date of the purchase. One way a retailer can collect purchase data is to provide customer loyalty cards that are used to tag purchases with the customer's identity. Another way of collecting purchase data is by having a customer set up an on-line account in order to make on-line purchases.

Customer-specific research data records each time a customer researches a product at the retailer's website and the time at which the research event occurred. In one embodiment, research events are tabulated based on mouse click stream data collected by the retailer's web server. An on-line research event for a product may be counted when a customer simply clicks on the product's name or image or when the customer spends a certain amount of time with the product on the screen. Any number of criteria may be used to determine whether a research event for a product has occurred. This type of research data is already being stored, on a per customer basis, by most retailers.

As already discussed, traditional choice forecasting models are based on variables that are not related to a particular customer's cross-channel loyalty. The variables used by traditional models include brand specific sales and marketing attributes such as price, promotion discount, promotion vehicles, and so on, channel variables that describe the sales channels such as store size, social-influence variables, channel integration variables, and situational variables. In addition, demographic variables that describe customers are also often considered in forecasting customer choice. Data for one or more of these "choice" variables is input to the system 100 (e.g., the "other choice data" database in FIG. 1). This type of data may not be collected by the retailer itself, but may be collected by a third party that offers subscriptions to this type of data.

The research data, purchase data, and other choice data are depicted as being stored in respective databases. Of course, any or all of this data may be stored in any type of data structure that is amenable to querying or other access by a channel forecast logic 110.

As will be described in more detail with reference to FIG. 2, the channel forecast logic 110 inputs selected research data, purchase data, and other choice data to a forecast model that calculates the purchase probabilities. In the described embodiment, the purchase probabilities are calculated on a per-product (e.g., specific brand and item type) basis. In other embodiments, the purchase probabilities may be calculated on a product type (e.g., dental hygiene, laundry) basis or even a per customer basis. The level of granularity can be controlled by adjusting the granularity of the purchase and research data upon which the purchase probabilities are based.

In one embodiment, the channel choice forecasting system 100 is a computing/data processing system including an application or collection of distributed applications for enterprise organizations. The applications and channel choice forecasting system 100 may be configured to operate with or be implemented as a cloud-based networking system, a software as a service (SaaS) architecture, or other type of networked computing solution. In one embodiment the channel forecast logic 110 is a centralized server-side application that provides at least the functions disclosed herein and that is accessed by many users via computing devices/terminals communicating with the channel choice forecasting system 100 (functioning as the server) over a computer network.

Figure 2:
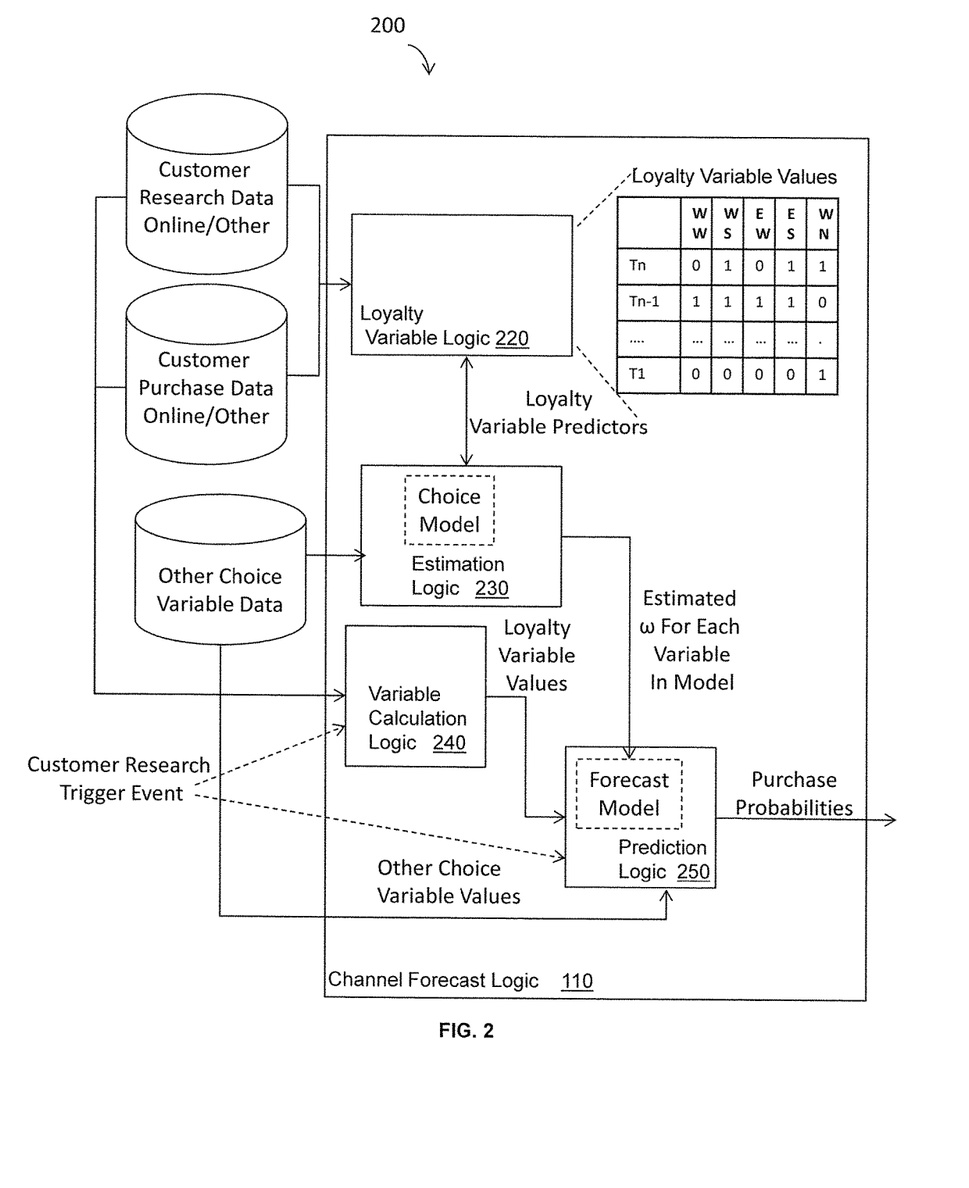
FIG. 2 illustrates another example embodiment of a system associated with forecasting customer channel choice using cross-channel loyalty.

FIG. 2 illustrates a channel choice forecasting system 200 that includes one embodiment of the channel forecast logic 110. The channel choice forecast logic 110 includes loyalty variable logic 220 that i) determines historical values for five customer loyalty variables and ii) determines a loyalty variable predictor for each of the loyalty variables. As will be described in more detail below, the loyalty variable predictors are used to generate loyalty variable values for input to the forecast model. The loyalty variables correspond to specific sequences of research and purchase events. As shown in the table in FIG. 2, the loyalty variables include "WW" indicating Web (i.e., on-line) research and Web purchase, "WS" indicating Web research and in-store purchase, EW indicating every other type (i.e., non-Web) research and Web purchase, ES indicating every other type research and in-store purchase, and WN indicating Web research and no purchase either on-line or in-store.

The loyalty variable logic 220 accesses the research data and the purchase data to tabulate customer-specific values for each of the loyalty variables for some number of previous time periods (e.g., T1-Tn in the table in FIG. 2). In one embodiment, the time period is a week. The loyalty variable logic 220 correlates, in time and for each customer, research events for a given product and purchases of the product.

In this manner, if, during the time period, at least one research event occurs on-line that is followed within a predetermined amount of time by an on-line purchase of the product, the loyalty variable WW is assigned a value of 1, otherwise, the variable is assigned the value of 0. If, during the time period, at least one research event occurs on-line that is followed within a predetermined amount of time by an in-store purchase of the product, the loyalty variable WS is assigned a value of 1, otherwise, the variable is assigned the value of 0. If, during the time period, at least one on-line purchase of the product occurs without detection of an on-line research event within the predetermined time period prior to the purchase, the loyalty variable EW is assigned a value of 1, otherwise, the variable is assigned the value of 0.

If, during the time period, at least one in-store purchase of the product occurs without detection of an on-line research event within the predetermined time period prior to the purchase, the loyalty variable ES is assigned a value of 1, otherwise, the variable is assigned the value of 0. If, during the time period, at least one research event occurs on-line that is not followed within a predetermined amount of time by a purchase of the product either on-line or in-store, the loyalty variable WN is assigned a value of 1, otherwise, the variable is assigned the value of 0.

The loyalty variable logic 220 determines loyalty variable predictors based on the historical values of the loyalty variables. A loyalty variable predictor estimates a current value of the loyalty variable based on its historical values. The predictor is used to generate a value for the loyalty variable at the time the trigger event occurs. The loyalty variable value generated by the predictor is input to the forecast model. The loyalty variable cannot be used directly in the forecast model because when the customer research trigger event occurs at some time in the future there is no way to know what the value of the loyalty variable should be at that future time. In other words, the function of the system 200 is to make a forecast of the customer's purchasing behavior (e.g., purchase probabilities) and therefore the forecast of the purchasing behavior cannot itself be an input variable that encodes the customer's forecasted purchasing behavior.

Each loyalty variable predictor is a function that can be used to generate a value for the loyalty variable based on some number of previous values of the loyalty variable. In the loyalty variable predictor, a smoothing parameter $\beta$ is applied to each prior value of the loyalty variable (e.g., the value of WS at Tn, Tn−1, Tn−2, and so on). The loyalty variable logic 220 computes the $\beta$ to be applied to each prior value based on the historical loyalty variable data for the customer. The resulting loyalty variable predictors are provided to a variable calculation logic 240 that generates a present value of the loyalty variables at the time the customer research trigger event occurs. The generated values are input, along with the other choice variable data, to the forecast model as will be described in more detail below.

An estimation logic 230 controls inputs to a choice model that is used to determine parameters for the forecast model. The choice model is a statistical model that computes probabilities of various outcomes or choices occurring based on some combination of input variables (e.g., loyalty variables and other choice variables). A forecast model will be determined for each product category, or any other grouping of products sold by the retailer (e.g., "clothes", toothpaste, dairy products, and so on). In one embodiment, the choice model (and forecast model) is a multinomial logit model. The set of choices in the multinomial logit model are explained by way of example, as follows. The set of choices are the combinations of brands in the category and the 5 loyalty variables. Thus, if the category has 30 brands, there are 30×5 alternatives in the multinomial logit model. The choice of brand as the differentiating factor between choices is arbitrary, any attribute of the products may be used. To simplify computation, an attribute having a relatively small number of values may be selected.

While there is any number of ways to compute $\beta$ for the loyalty variable predictors, two different approaches to compute $\beta$ are described herein. The first approach, described in FIG. 3, uses linear regression on some number of prior loyalty variable values to determine $\beta$. This method is well suited for loyalty variable data for products that are purchased often, meaning that the loyalty variable data will not be too sparse (i.e., there will be enough "1" values to provide a meaningful estimation). The method 300 determines β based only on loyalty variable data. The resulting loyalty variable predictors are then provided to the estimation logic 230 for input, along with the other choice variables, into the choice model.

Figure 4:
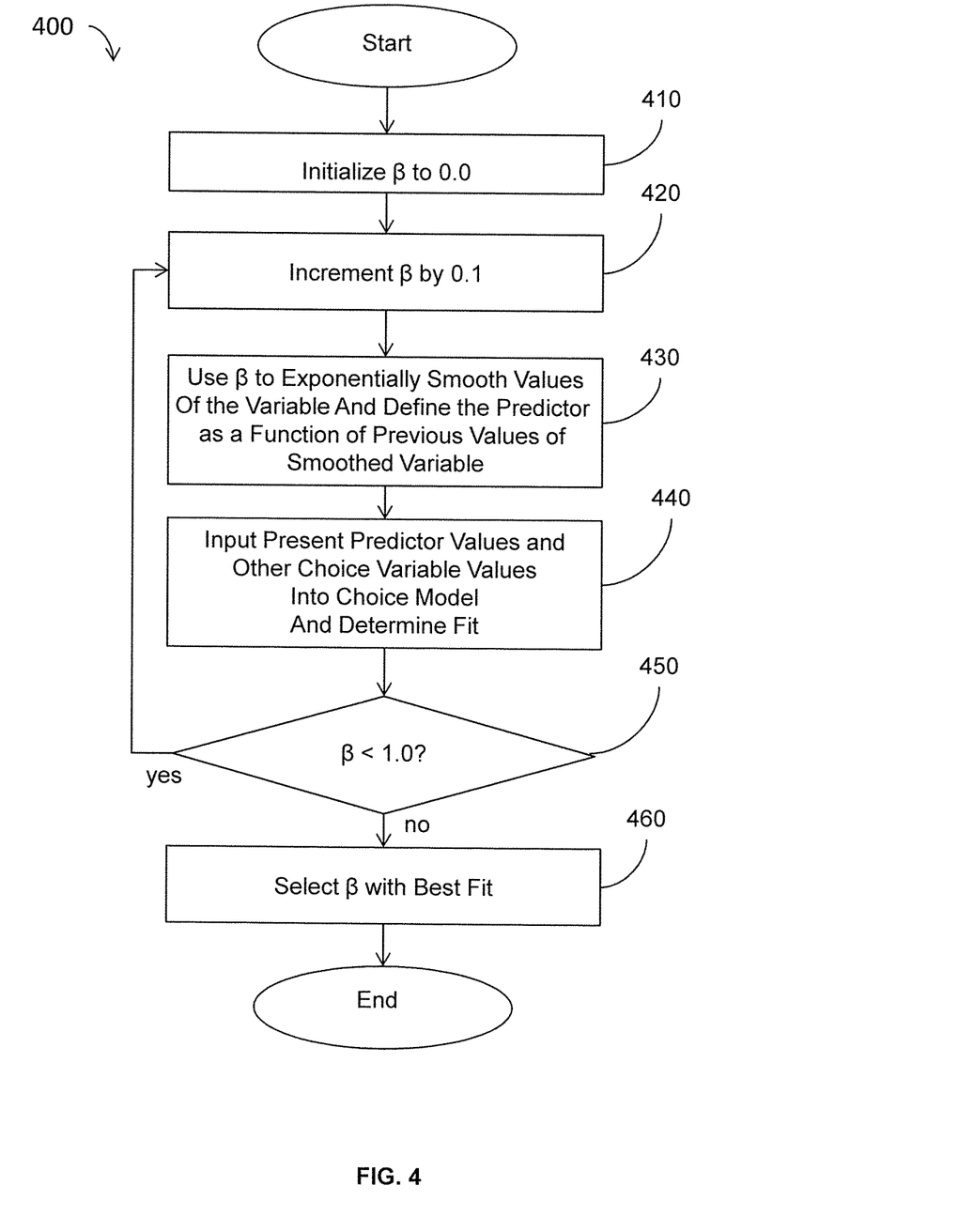
FIG. 4 illustrates another example embodiment of a method for determining a loyalty variable predictor.

A second approach to computing β, described in FIG. 4, iteratively sets a value for β and inputs the resulting loyalty variable predictors as well as the other choice variables to the choice model. The value of β that provides the best fit in the choice model is selected for use in the loyalty variable predictors. Thus, in this method, the loyalty variable logic 220 cooperates with the estimation logic 230 to determine β. This approach is more computationally intensive, but compensates for the sparseness of the loyalty variable data when purchases do not occur often. In one embodiment, a user configuring the system 200 can select which method of computing the smoothing parameter β should be used.

Figure 3:
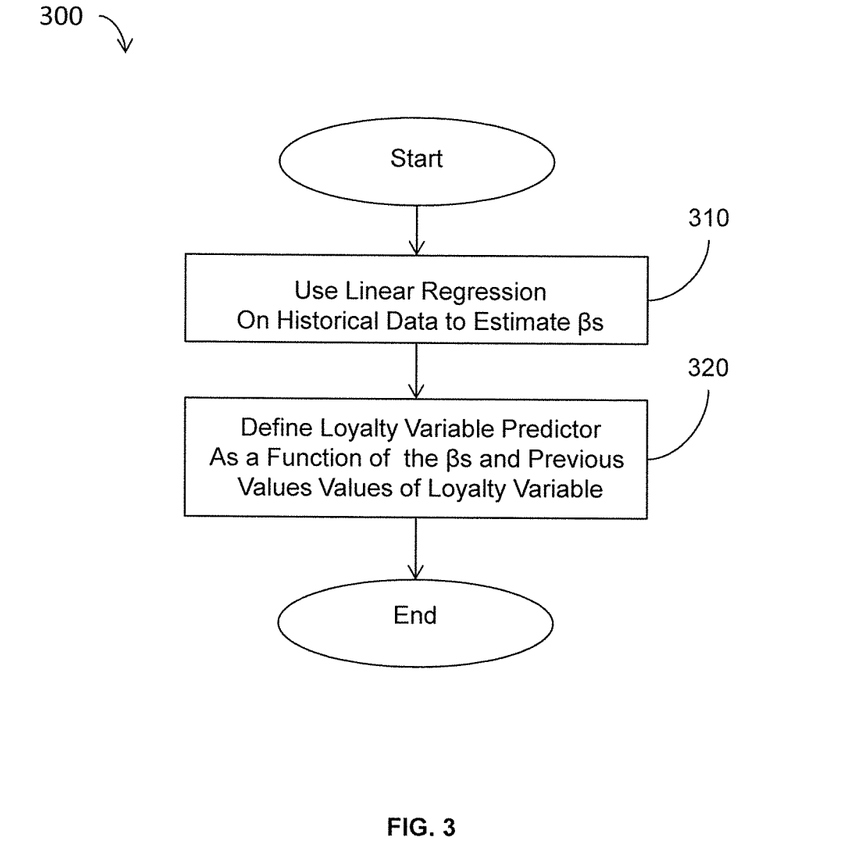
FIG. 3 illustrates one example embodiment of a method for determining a loyalty variable predictor.

FIG. 3 illustrates one embodiment of a method 300 that can be used by the loyalty variable logic 220 to determine the loyalty variable predictors. The method 300 is used to generate a loyalty variable predictor for each of the five loyalty variables based on historical values of the loyalty variable for the particular customer being analyzed. For the purposes of this description, the loyalty variable WS, which indicates Web research followed by an in-store purchase—the typical "channel switch", will be used. The same process is used to determine the predictor for each loyalty variable.

At 310, linear regression is used on historical loyalty variable data to estimate $β_k$ as shown in Equation 1, where "i" designates customer "i".

$$WS_i(t) \sim β_1 WS_i(t-1) + β_2 WS_i(t-2) + β_3 WS_i(t-3) β_4 WS_i(t-4)$$ EQ. 1

At 320, the loyalty variable predictor $\widehat{WS}_i(t)$ is defined as shown in Equation 2.

$$\widehat{WS}_i(t) = β_1 WS_i(t-1) + β_2 WS_i(t-2) + β_3 WS_i(t-3) + β_4 WS_i(t-4)$$ EQ. 2

Thus, the loyalty variable predictor $\widehat{WS}_i(t)$ computed by the method 300 predicts the value for WS in terms of its four prior values and $β_k$. In other embodiments, other numbers of prior values may be used. The linear regression is repeated for each of the other four loyalty variables. The five loyalty variable predictors are provided to the estimation logic 230 for input to the choice model. The choice model is used to determine parameters for the forecast model that calculates the purchase probabilities as will be described in more detail below. The linear regression may be performed by a software product that performs linear regression on an input set of variables.

FIG. 4 illustrates one embodiment of an alternative method 400 that can be used by the loyalty variable logic 220 to determine the loyalty variable predictors. The method 400 iterates through values of β and selects a value of β that yields the best fit in the choice model. At 410, β is initialized to 0.0 and at 420, β is incremented by 0.1, thus in the first iteration, β will be 0.1. At 430, the loyalty variable data is exponentially smoothed, using the present value of β as shown in Equation 3.

$$\widehat{WS}_i(t) = (1-β) \widehat{WS}_i(t-1) + β WS_i(t)$$ EQ. 3

The loyalty variable predictor is defined as a function of previous values of the smoothed variable data as shown in Equation 4.

$$\widehat{WS}_i(t) = \widehat{WS}_i(t-1)$$ EQ. 4

This is a standard use of exponential smoothing for forecasting, where the value at time t is forecast from the smoothed values from time t−1 and before.

At 440, the present values of the five loyalty variable predictors computed using the present value of β are input to the choice model, along with the other choice variable data and a fit is determined for the choice model using the present value of β. At 450, the method determines whether β is equal to 1.0, meaning that all values of β have been considered. If not, the method returns to 420 and the value of β is incremented by 0.1. Once all values of β have been considered, at 460 the value of β that yielded the best fit in the choice model is selected for the loyalty variable predictor.

Returning to FIG. 2, the estimation logic 230 is configured to input the present value of the loyalty variable as calculated using the loyalty variable predictors, which are functions of the selected β, and other choice variable data to a choice model to determine parameters (designated as ω) that will be used in the forecast model. The forecast model is a function of the loyalty variable values (as generated by using the loyalty variable predictor at the time a forecast is called for) and the other choice variables as weighted by a respective ω. The choice model selects values for each ω that provide the best fit with the historical data. Once the ω for each variable has been determined, the estimation logic 230 provides the resulting forecast model to a prediction logic 250 that will use the forecast model calculate the purchase probabilities as described below.

The loyalty variable predictors and ω values for the forecast model can be re-calculated periodically to allow the forecast model to learn recent behavior of the customers. In one embodiment, the re-calculation is performed offline with respect to the retailer's day to day transactions in a manner that balances system resource usage with forecast model accuracy. In one embodiment, the loyalty variable predictors and the forecast model are determined by a web based service that imports a retailer's purchase and research data and periodically provides the loyalty variable predictors and forecast model to the retailer for use the retailer for marketing purposes.

The trigger event is detected by the channel forecast logic 110. In response to the trigger event, the variable calculation logic 240 is activated to generate the present values of the loyalty variables. In one embodiment the trigger event is a customer research event that is detected by the retailer's web server determining that a customer has clicked on a product. The present values of the loyalty variables are provided to the prediction logic 250, which inputs the values, along with current values of the other choice variables to the forecast model. While other choice variables are used as inputs to the loyalty variable logic 220, the estimation logic 230, and the prediction logic 250, in one embodiment, only the loyalty variable values are input to one or more of these logics.

The forecast model will output a probability of each choice being made by the particular customer based on the variables. Recall that each choice is one of the loyalty variables combined with one value of the selected product attribute (e.g., brand). So, for example, the forecast model will output a probability that WS will occur and that brand A will be involved, the probability that WW will occur and that brand A will be involved, the probability that an EW will occur and that brand A will be involved, the probability that an ES will occur and that brand A will be involved, the probability that an WN will occur and that brand A will be involved, and so on for each brand. These probabilities are all joint probabilities, meaning the probability that the customer will consider a particular brand and that jointly the customer will execute a particular one of the 5 alternatives for channel loyalty.

The prediction logic 250 uses the probabilities output by the forecast model to calculate three conditional probabilities for i) on-line purchase, ii) in-store purchase, and iii) no purchase of the product given that a customer is researching the product on-line. These conditional probabilities are the purchase probabilities output by the system 200. To compute the conditional probabilities, the prediction logic 250 first sums together those probabilities associated with the brand that is being researched by the customer in which the research is performed on-line. So if the customer is researching Colgate toothpaste, the prediction logic 250 will sum the probability that WS occurs for Colgate, the probability that WW occurs for Colgate, and the probability that WN occurs for Colgate.

To determine the probability that an on-line purchase of a product will be made, given that the customer is researching the product on-line, the prediction logic 250 divides the probability that WW (Web research and Web purchase) will occur for the product is by the sum. To determine the probability that an in-store purchase of a product will be made, given that the customer is researching the product on-line, the prediction logic 250 divides the probability that WS (Web research and in-store purchase) will occur for the product is by the sum. To determine the probability that no purchase of a product will be made, given that the customer is researching the product on-line, the prediction logic 250 divides the probability that WN (Web research and no purchase) will occur for the product is by the sum. The purchase probabilities give an indication of a customer's cross-channel loyalty, or the probability that the customer will make a purchase using the same channel in which research is being performed.

The prediction logic 250 outputs or otherwise provides the purchase probabilities to the retailer for use in marketing efforts. The purchase probabilities may be used for forecasting purpose and/or to determine a marketing communication that will be made to the customer doing the on-line product research. For example, consider two customers who are researching the same product being sold by a retailer that wants to increase its on-line sale. If the purchase probabilities for the first customer indicate that she is most likely to buy the product in-store, the retailer may send an offer of a discount for the product's purchase if the purchase is made on-line. If the purchase probabilities for the second customer indicate that he is very likely to purchase on-line, the retailer may refrain from sending an offer to that customer. In this manner, the retailer can target marketing efforts to individual consumers based on their cross-channel loyalty.

Figure 5:
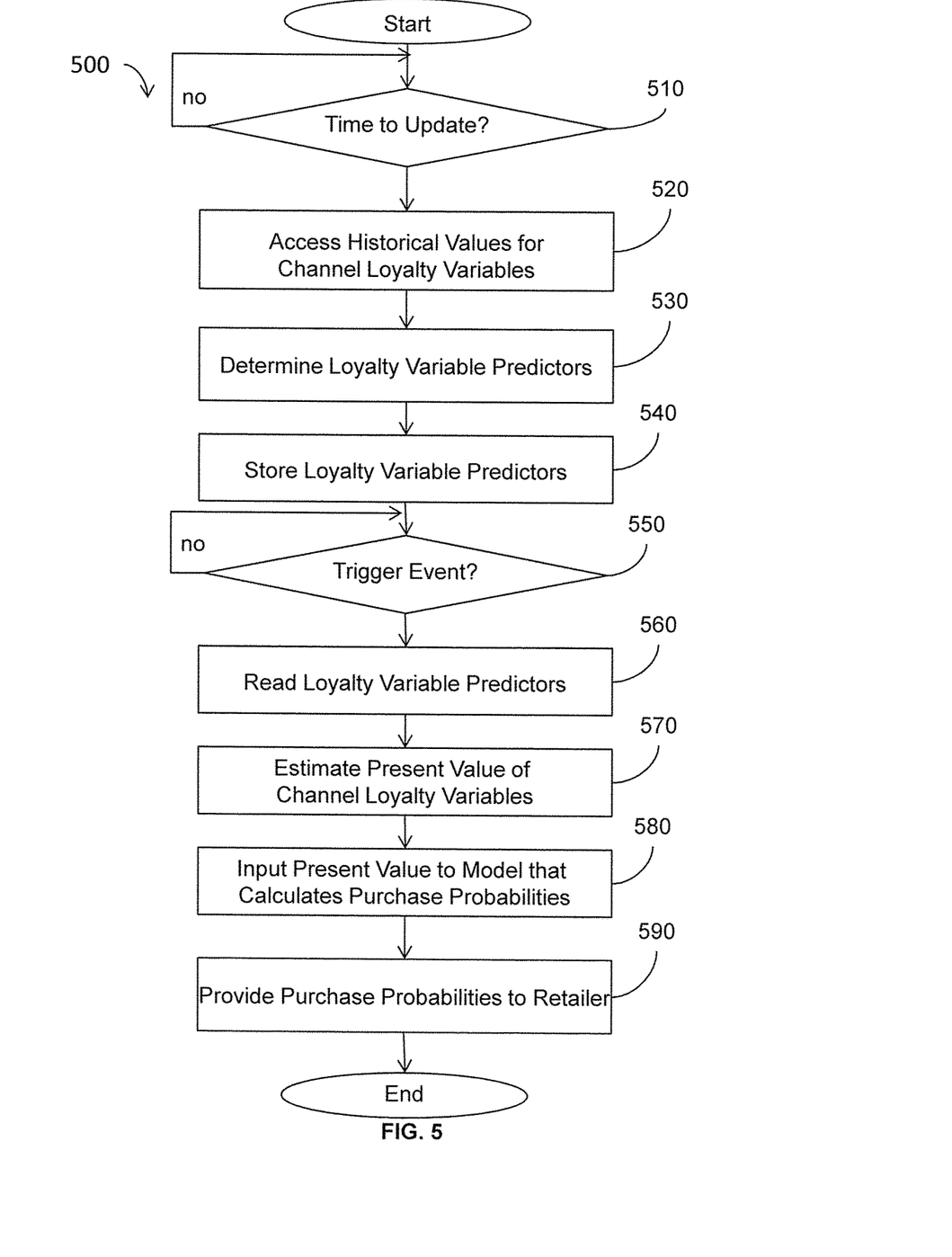
FIG. 5 illustrates one example embodiment of a method for forecasting customer channel choice using cross-channel loyalty.

FIG. 5 illustrates one embodiment of a method 500 that calculates, on demand and in response to a trigger event, purchase probabilities that estimate a likely purchase channel for a customer researching a product. The method 500 may be performed by the channel forecast logic 110 of FIGS. 1 and 2. At 510, the method includes determining whether it is time to update the loyalty variable predictors and the forecast model. Recall that the loyalty variable predictors and the forecast model may be periodically updated to keep the model current with respect to customer behavior. The method 500 may determine whether it is time to update based on a simple duration of time (e.g., weekly, monthly) selected based on the rapidity with which customer behavior is expected to evolve. Other events that may indicate that it is time to update include a command being received from a user or detection of some amount of error in the forecast model.

At 520, a first data structure that stores historical values for each of one or more loyalty variables for respective customers is accessed. Each loyalty variable corresponds to a combination of research channel and purchase channel that are associated with a same product research event by a given customer. This step may be performed by the loyalty variable logic 220 of FIG. 2. In one embodiment, the first data structure is a database table like the table shown in FIG. 2 and the historical values are accessed by a query on the table. In one embodiment, the first data structure is accessed by some other memory access process that reads, transfers, or inputs the contents of a register or memory address into working memory of the channel forecast logic 110.

At 530, the method includes determining respective loyalty variable predictors for each of the one or more loyalty variables for each customer based on the historical values. This step may be performed by the loyalty variable logic 220 of FIG. 2. In one embodiment, the calculations are made by a processor that is in computer communication with the loyalty variable logic 220. Recall that calculation of the loyalty variable predictors may include modeling customer channel choice using a multinomial logit choice model.

At 540, the respective loyalty variable predictors for the respective customers are stored in a second data structure. This step may be performed by the loyalty variable logic 220 of FIG. 2. In one embodiment, the second data structure is a database table that can be queried by the variable calculation logic 240 of FIG. 2. In one embodiment, the second data structure is a register or memory address, the contents of which may be read, input, or transferred into the working memory of the channel forecast logic 110.

At 550, the method includes determining whether a trigger event has occurred. In one embodiment, the trigger event is detected by a web server registering that a given customer has "clicked" on a particular product at the retailer's web site. Other trigger events may include the retailer receiving an electronic communication such as an e mail from a particular customer regarding a given product. The retailer may also manually perform a trigger event that specifies a customer of interest.

At 560, in response to a trigger event associated with a given customer, the method includes accessing the second data structure to read the loyalty variable predictors for the customer. This step may be performed by the variable calculation logic 220 of FIG. 2. In one embodiment, the second data structure is a database table and the loyalty variable predictors are accessed by a query on the table. In one embodiment, the second data structure is accessed by some other memory access process that reads, transfers, or inputs the contents of a register or memory address into working memory of the channel forecast logic 110.

At 570, a present value of each of the one or more loyalty variables for the customer is estimated based, at least in part, on the loyalty variable predictors. This step may be performed by the variable calculation logic 220 of FIG. 2. In one embodiment, the calculations are made by a processor that is in computer communication with the variable calculation logic 220. The present values are stored in memory that is accessible to the prediction logic 250.

At 580, the present value of each of the loyalty variables is input to a forecast model that calculates, for each channel, a probability that the customer will make a purchase using the channel. This step may be performed by the prediction logic 250 of FIG. 2. In one embodiment, the present value of the loyalty variables may be stored in a predetermined memory location or table that is allocated as storing the input variable for the forecast model. In one embodiment, a processor that is in computer communication with the prediction logic 250 employs the forecast model to compute the purchase probabilities and stores the purchase probabilities in memory accessible to the prediction logic 250.

At 590, the method includes providing the purchase probabilities for use in selecting a marketing message to be communicated to the customer. This step may be performed by the prediction logic 250 of FIG. 2. The purchase probabilities may be communicated to the retailer by transmitting the purchase probabilities in an electronic communication or storing the purchase probabilities in a predetermined memory location, register, or table that is accessible to the retailer.

In one embodiment the method 500 includes calculating the loyalty variable predictors. In this embodiment the method includes accessing a third data structure that records research data corresponding to customer research events. The research data includes a time at which the research event occurs and a channel in which the research event is performed. The method also includes accessing a fourth data structure that records purchase data corresponding to customer purchases. The purchase data includes a time at which the purchase is made and a channel in which the purchase is made. The research data and the purchase data are correlated in time to determine the historical values for the one or more loyalty variables for respective customers; and the historical values are stored in the first data structure. These steps may be performed by the loyalty variable logic 220 of FIG. 2. In one embodiment, the third and/or fourth data structures are database tables and the historical values are accessed by a query on the table. In one embodiment, the third and/or fourth data structures are accessed by some other memory access process that reads, transfers, or inputs the contents of a register or memory address into working memory of the channel forecast logic 110.

In one embodiment, the method includes determining each loyalty variable predictor by: performing linear regression on the historical values of the corresponding loyalty variable to determine a smoothing parameter for the loyalty variable; and determining the loyalty variable predictor to be a function that combines previous values of the loyalty variable as weighted by the smoothing parameter. In one embodiment, these steps are performed by the loyalty variable logic 220 of FIG. 2. In one embodiment, the historical values may be stored in a predetermined memory location or table. In one embodiment, a processor that is in computer communication with the loyalty variable logic 220 performs the linear regression and stores the selected smoothing parameter in memory accessible to the loyalty variable logic 220.

In one embodiment, the method includes determining each loyalty variable predictor by incrementally increasing a value of a smoothing parameter. For each smoothing parameter value, the method includes: smoothing previous values of the corresponding loyalty variable with the smoothing parameter; defining the loyalty variable predictor as a function of the smoothed previous values; and inputting i) a present value of the loyalty variable predictor and ii) values of other choice related variables into a choice model to determine a fit for the choice model. The method further includes identifying the smoothing parameter value that results in the best fit and determining the loyalty variable predictor to be a function that combines previous values of the corresponding loyalty variable as weighted by the identified smoothing parameter. In one embodiment, these steps are performed by the loyalty variable logic 220 of FIG. 2. In one embodiment, the historical values may be stored in a predetermined memory location or table. In one embodiment, a processor that is in computer communication with the loyalty variable logic 220 employs the choice model to determine the fit and stores the selected smoothing parameter in memory accessible to the loyalty variable logic 220.

In one embodiment, the method 500 includes determining the forecast model by determining a model that best predicts a customer's purchase channel choice based at least in part on a present value of i) each of the loyalty variables and ii) one or more other choice related variables. In one embodiment, these steps are performed by the estimation logic 230 of FIG. 2. In one embodiment, the present values may be stored in a predetermined memory location or table. In one embodiment, a processor that is in computer communication with the estimation logic 230 employs the choice model to forecast model parameters (i.e., $\omega$) and stores the forecast model in memory accessible to the prediction logic 250.

It can be seen that steps 510-540 are performed on some periodic basis while steps 560-590 are performed in response to the trigger event. Thus the computationally intense calculation of the loyalty variable predictors can be performed as time and computer resources allow. When the trigger event occurs, the operations that are performed are limited to computing the present value of the loyalty variables and inputting the computed values and the other choice variable data into the forecast model. In this manner, the time required by a processor performing the operations is reduced so that the purchase probabilities can be computed and returned on demand. Further, the amount of memory that must be accessed after the trigger event is reduced because the memory intensive tasks of determining the loyalty variable predictors and selecting the forecast model parameters has already been performed.

As can be seen from the foregoing description, the systems and methods described herein not only forecast a given customer's channel choice based on the customer's channel choice history, but also learn changes in the customer's channel choice over time. The systems and methods can learn from recent customer behavior, so that if the customer starts making the final purchase on-line instead of in-store, the forecasted channel choice will reflect this increased propensity of the customer to buy on-line. Moreover, very little additional data is needed to forecast the customer's channel choice.

By performing periodically updating the forecast model and the loyalty variable predictors off line, web-based targeted marketing efforts based on the customer's cross-channel loyalty can be performed by computer in real time without adversely affecting the retailer's computer-based consumer transactions.

Computing Device Embodiment

Figure 6:
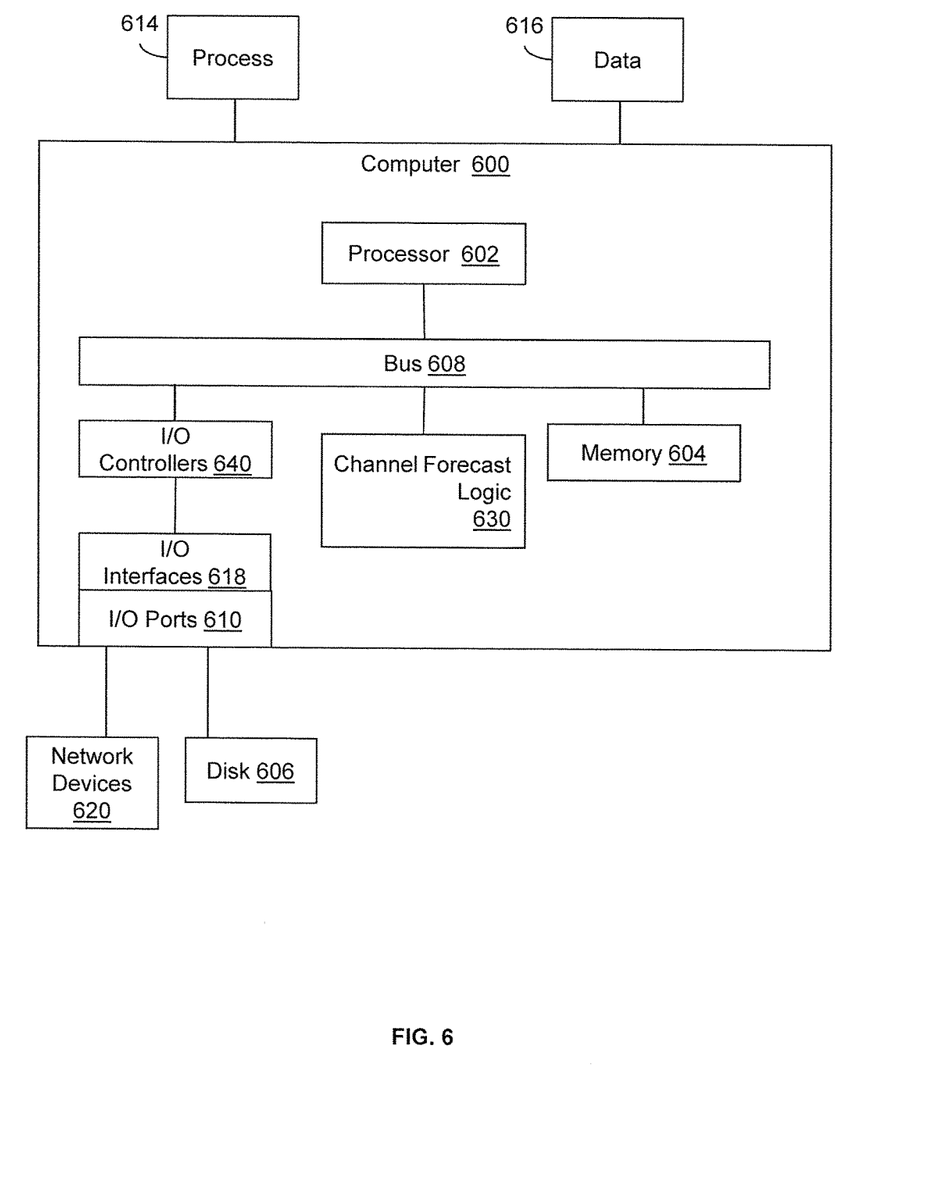
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include channel forecast logic 630 configured to facilitate forecasting customer channel choice in a manner similar to the channel forecast logic 110 shown in FIGS. 1 and 2. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform the method 300 of FIG. 3, method 400 of FIG. 4, and/or method 500 of FIG. 5, as further explained in FIGS. 1 and 2. The means may also be implemented as stored computer executable instructions that are presented to computer 600 as data 616 that are temporarily stored in memory 604 and then executed by a processor 602.

Logic 630 may also provide means (e.g., hardware, non-transitory computer-readable medium that stores executable instructions, firmware) for performing the method 300 of FIG. 3, method 400 of FIG. 4, and/or method 500 of FIG. 5, as further explained in FIGS. 1 and 2.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disk-read only memory (CD-ROM) drive, a CD recordable (CD-R) drive, a CD read/write (CD-RW) drive, a digital video disc (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the I/O interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor cause the processor to perform functions, the instructions comprising instructions for:

accessing a first data structure that stores historical values for each of one or more loyalty variables for a plurality of customers, wherein each loyalty variable corresponds to a combination of stored research channel information and stored purchase channel information that are associated with a same product research event by a given customer of the plurality of customers;

determining loyalty variable predictors for each of the one or more loyalty variables for each of the plurality of customers based on the historical values, wherein the determining the loyalty variable predictors for each of the one or more loyalty variables step further comprises the steps of:

performing linear regression on the historical values of a loyalty variable to determine a smoothing parameter for the loyalty variable; and determining a loyalty variable predictor to be a function that combines previous values of the loyalty variable as weighted by the smoothing parameter;

storing, in a second data structure, the loyalty variable predictors for each of the plurality of customers;

in response to a trigger event associated with the given customer, accessing the second data structure to obtain the loyalty variable predictors for the given customer;

estimating a present value of each of the one or more loyalty variables for the given customer based, at least in part, on the loyalty variable predictors;

inputting the present value of each of the loyalty variables into a forecast model that determines, based upon the research channel information and the purchase channel information, a probability that the given customer will make a purchase using the research channel information and the purchase channel information, based at least in part on the present values by determining a model that best predicts a customer's purchase channel choice based at least in part on a present value of i) each of the loyalty variable predictors and ii) one or more other choice related variables;

generating purchase probabilities of the given customer and selecting a marketing message from a plurality of marketing messages to be communicated to the given customer based at least on the purchase probabilities; and transmitting the selected marketing message over a computer network to a device associated with the given customer so the given customer has access to information in the marketing message.

2. The non-transitory computer-readable medium of claim 1, wherein the instructions further comprise instructions for tabulating the historical values by:
- accessing a third data structure that records the research channel data corresponding to customer research events, wherein the research channel data includes a time at which the research event occurs and a research channel in which the research event is performed;
- accessing a fourth data structure that records the purchase channel data corresponding to customer purchases, wherein the purchase channel data includes a time at which the purchase is made and a purchase channel in which the purchase is made;
- correlating the research channel data and the purchase channel data in time to determine the historical values for the one or more loyalty variables for the plurality of customers; and
- storing the historical values in the first data structure.

3. The non-transitory computer-readable medium of claim 1, wherein the forecast model comprises a multinomial logit model.

4. The non-transitory computer-readable medium of claim 1, wherein the determining of the loyalty variable predictors and the determining of the forecast model are performed periodically to update the loyalty variable predictors and the forecast model to reflect recent customer behavior.

5. A computing system, comprising:
- an input/output port for transmitting and receiving network communications;
- a memory including instructions stored therein; and
- a processor electrically connected with the input/output port and with the memory, wherein the processor is configured to execute the instructions from the memory and when the instructions are executed, cause the processor to:
- generate a graphical user interface on a monitor;
- in response to a user interaction with the graphical user interface associated with a monitoring and controlling of a transmittal of a selected marketing message to a given customer, wherein the monitoring and controlling of a transmittal of a selected marketing message to a given customer is associated with the processor and the graphical user interface;
- access, by the processor, a first data structure that stores historical values for each of one or more loyalty variables for a plurality of customers, wherein each loyalty variable corresponds to a combination of stored research channel information and stored purchase channel information that are associated with a same product research event by the given customer of the plurality of customers;
- determine, by the processor, loyalty variable predictors for each of the one or more loyalty variables for each of the plurality of customers based on the historical values, wherein the instructions causing the processor to determine the loyalty variable predictors for each of the one or more loyalty variables further comprise instructions to:
  - perform, by the processor, linear regression on the historical values of a loyalty variable to determine a smoothing parameter for the loyalty variable; and
  - determine, by the processor, a loyalty variable predictor to be a function that combines previous values of the loyalty variable as weighted by the smoothing parameter; and
- store, by the processor, in a second data structure, the loyalty variable predictors for each of the plurality of customers;
- wherein the channel forecast processor is further configured to, in response to a trigger event associated with the given customer:
- access, by the processor, the second data structure to obtain the loyalty variable predictors for the given customer;
- estimate, by the processor, a present value of each of the one or more loyalty variables for the given customer based, at least in part, on the loyalty variable predictors;
- input, by the processor, the present value of each of the loyalty variables into a forecast model that determines, based upon the research channel information and the purchase channel information, a probability that the given customer will make a purchase using the research channel information and the purchase channel information, based at least in part on the present values by determining a model that best predicts a customer's purchase channel choice based at least in part on a present value of i) each of the loyalty variable predictors and ii) one or more other choice related variables;
- generate, by the processor, purchase probabilities of the given customer and selecting a marketing message from a plurality of marketing messages to be communicated to the given customer based at least on the purchase probabilities; and
- transmit, by the processor, the selected marketing message over a computer network to a device associated with the given customer so the given customer has access to information in the marketing message.

6. The computing system of claim 5, wherein the channel forecast logic processor comprises loyalty variable logic configured to:
- access, by the processor, a third data structure that records the research channel data corresponding to customer research events, wherein the research data includes a time at which the research event occurs and a research channel in which the research event is performed;
- access, by the processor, a fourth data structure that records the purchase channel data corresponding to customer purchases, wherein the purchase data includes a time at which the purchase is made and a purchase channel in which the purchase is made;
- correlate, by the processor, the research channel data and the purchase channel data in time to determine the historical values for the one or more loyalty variables for plurality of customers; and
- store, by the processor, the historical values in the first data structure.

7. The computing system of claim 5, wherein the processor is configured to determine the loyalty variable predictors and the forecast model periodically to update the loyalty variable predictors and the forecast model to reflect recent customer behavior.

8. A computer implemented method, comprising:
- accessing a first data structure that stores historical values for each of one or more loyalty variables for a plurality of customers, where each loyalty variable corresponds to a combination of stored research channel information and stored purchase channel information that are associated with a same product research event by a given customer of the plurality of customers;
- determining loyalty variable predictors for each of the one or more loyalty variables for each of the plurality of customers based on the historical values, wherein the determining the loyalty variable predictors for each of the one or more loyalty variables step further comprises the steps of:
incrementally increasing a value of a smoothing parameter, and for each smoothing parameter value:
smoothing previous values of a loyalty variable with the smoothing parameter;
defining a loyalty variable predictor as a function of the smoothed previous values of the loyalty variable; and
inputting i) a present value of the loyalty variable predictor and ii) values of other choice related variables into a choice model to determine a fit for the choice model;
identifying a smoothing parameter value that results in a best fit; and
determining the loyalty variable predictor to be a function that combines previous values of the loyalty variable as weighted by the identified smoothing parameter value;
storing, in a second data structure, the loyalty variable predictors for each of the plurality of customers;
in response to a trigger event associated with the given customer,
accessing the second data structure to obtain the loyalty variable predictors for the given customer;
estimating a present value of each of the one or more loyalty variables for the given customer based, at least in part, on the loyalty variable predictors;
inputting the present value of each of the loyalty variables into a forecast model that determines, based upon the research channel information and the purchase channel information, a probability that the given customer will make a purchase using the research channel information and the purchase channel information, based at least in part on the present values by determining a model that best predicts a customer's purchase channel choice based at least in part on a present value of i) each of the loyalty variable predictors and ii) one or more other choice related variables;
generating purchase probabilities of the given customer and selecting a marketing message from a plurality of marketing messages to be communicated to the given customer based at least on the purchase probabilities; and
transmitting the selected marketing message over a computer network to a device associated with the given customer so the given customer has access to information in the marketing message.

9. The computer implemented method of claim 8, further comprising tabulating the historical values by:
accessing a third data structure that records the research channel data corresponding to customer research events, wherein the research data includes a time at which the research event occurs and a research channel in which the research event is performed;
accessing a fourth data structure that records the purchase channel data corresponding to customer purchases, wherein the purchase data includes a time at which the purchase is made and a purchase channel in which the purchase is made;
correlating the research channel data and the purchase channel data in time to determine the historical values for the one or more loyalty variables for plurality of customers; and
storing the historical values in the first data structure.

10. The computer implemented method of claim 8, wherein the forecast model comprises a multinomial logit model.

11. The computer implemented method of claim 8, wherein the determining of the loyalty variable predictors and the determining of the forecast model are performed periodically to update the loyalty variable predictors and the forecast model to reflect recent customer behavior.

* * * * *

UNITED STATES PATENT AND TRADEMARK OFFICE
CERTIFICATE OF CORRECTION

PATENT NO. : 10,467,654 B2  
APPLICATION NO. : 14/845792  
DATED : November 5, 2019  
INVENTOR(S) : Panchamgam et al.

Page 1 of 1

It is certified that error appears in the above-identified patent and that said Letters Patent is hereby corrected as shown below:

In the Drawings

On sheet 3 of 6, in FIG. 3, under Reference Numeral 320, Line 3, delete "Values Values" and insert -- Values --, therefor.

In the Claims

In Column 16, Line 4, in Claim 5, after "the" delete "channel forecast".

In Column 16, Lines 33-34, in Claim 6, after "the" delete "channel forecast logic".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*